Jan. 4, 1938.  J. R. YANCEY  2,104,177
PIPE FITTING
Original Filed Dec. 2, 1935
Fig. 1.
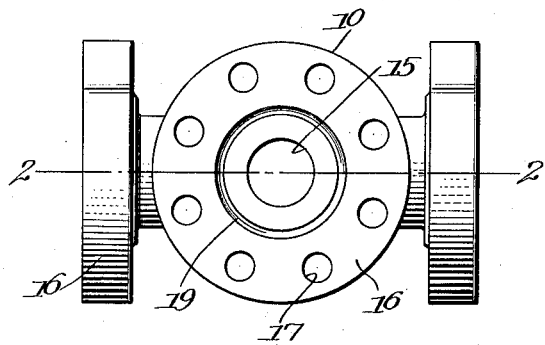
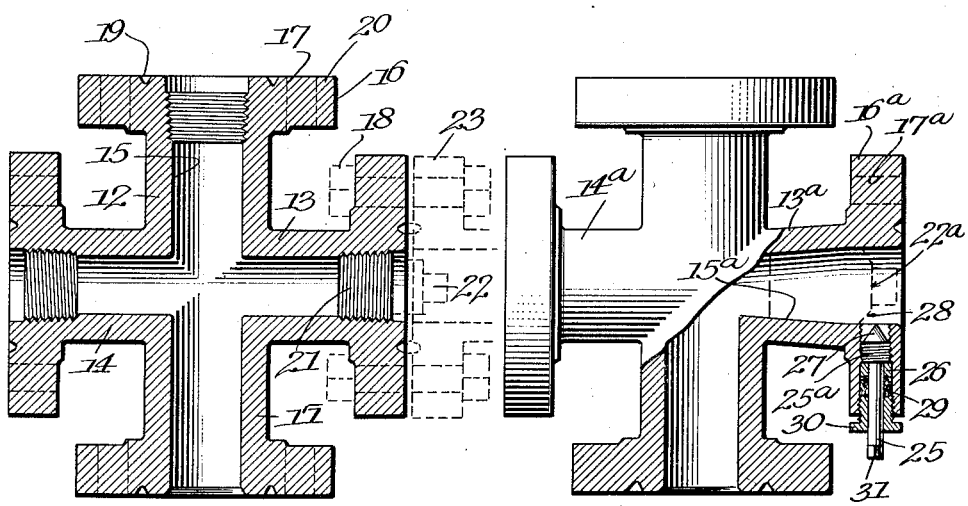
Fig. 2.  Fig. 3.
Inventor
John R. Yancey
By Cushman, Darby & Cushman
Attorneys Patented Jan. 4, 1938

2,104,177

UNITED STATES PATENT OFFICE 2,104,177

PIPE FITTING

John R. Yancey, Houston, Tex., assignor to Gray Tool Company, Houston, Tex., a corporation of Texas Original application December 2, 1935, Serial No. 52,585, now Patent No. 2,077,507, dated April 20, 1937. Divided and this application November 11, 1936, Serial No. 110,366

2 Claims. (Cl. 138—89)

The present invention relates to pipe fittings, the application being a division of my application Serial No. 52,585, filed December 2, 1935, Patent No. 2,077,507, of April 20, 1937, for Device for adjusting fittings or the like under fluid pressure.

The principal object of the invention is to provide a pipe fitting having at least one end thereof provided with two means to enable piping elements to be connected thereto, with each of the two connecting means so constructed and arranged with respect to each other that a piping element may be secured to the fitting by one of the connecting means without interfering with a piping element already secured by the other connecting means.

Other objects and advantages of the invention will be apparent from the following drawing, wherein:

Figure 1 is a top plan view of the pipe fitting;

Figure 2 is a sectional view on the line 2—2 of Figure 1, and

Figure 3 is a view, partly in elevation and partly in section, showing a modified form of fitting.

Referring to Figures 1 and 2, the numeral 10 designates a fitting of a form which may be used with the invention. The fitting shown is a cross fitting particularly adapted for use on oil wells as part of a Christmas tree. The fitting comprises vertical arms 11 and 12 and lateral arms 13 and 14, respectively intersecting bores 15 being formed in these arms and the end of each arm being provided with radially extending circumferential flanges 16. Each of the flanges 16 has circumferentially spaced apertures 17 therein arranged to receive bolts as indicated in dotted lines and by means of which similarly flanged piping elements may be secured to an arm of the present fitting. An annular groove 19 is formed in the face of each flange 16 between the apertures 17 and the mouth of the bore 15, the purpose of this groove being to receive a packing. The apertured flange construction described above, with or without the groove 19, forms an outer connecting means 20 by means of which a piping element may be secured to the fitting 10.

A second or inner connecting means is also provided on each of the arms of the fitting by the threading of the outer end of the bore of the arm as indicated at 21 on the arm 13. The threads 21 will receive a plug 22 (indicated in dotted lines) or other piping element, it being obvious that a pipe or other piping element such as indicated in dotted lines at 23 may be secured in place on the arm by the outer connecting means 20 without this step being hindered by the presence of the plug 22 or other piping element fitted to the inner connecting means or threads 21. On the other hand, if a pipe or other piping element, such as 23, is secured to the outer connecting means 20, a piping element such as plug 22 may be positioned in the bore 15 through the piping element 23 by the use of the tool disclosed in my above identified application, and without any hindrance from the latter.

It will be noted that Figure 2 shows no threads in the lower vertical arm 11 of the fitting. Such threads may be provided in this arm as desired. In some instances, the threads 21 in the upper arm 12 may be omitted.

Figure 3 shows a construction which is identical with that disclosed in Figure 2 except that the lateral arms 13a and 14a of Figure 3 have their bores 15a tapered outwardly toward the outer ends of the bores to receive a tapered plug 22a (shown in dotted lines) or other piping element having a tapered end. Since the bore 15a is not threaded, holding bolts 25 are positioned in apertures 26 in the peripheral edge of the flange 16a between certain of the apertures 17 and for the purpose of holding the plug 22a in seated position in the bore. The holding bolts 25 have their inner ends 27 tapered, the angle of the taper being such that it will coact with a tapered shoulder 28 on the plug 22a. Suitable packing, such as 29, is provided in the apertures 26 behind the heads 25a of the bolts 25, the packing being held in place by means of a gland nut such as 30. The outer end of each bolt 25 may be squared as indicated at 31 or otherwise formed to receive a wrench.

It will be noted that the operation of the holding bolts 25 will not be hindered by any piping element secured to the fitting by the outer connecting means 20 and also that the outer connecting means 20 may readily be availed of despite the presence of the inner holding means comprising the bolts 25.

In both the forms of the invention shown in Figures 2 and 3, the outer ends of the bores 15 should not be of a larger diameter than the diameter of the bore of a pipe or other bored piping element adapted to be fitted thereto by the outer connecting means, so that the inner connecting means will be available.

The fitting of the present invention is particularly adapted for use on oil or gas wells under a constant and unquenchable pressure, although it may be used for any purpose where constant and unquenchable pressures must be controlled.

The fact that either connecting means may be availed of without interfering with any piping element secured to the fitting by the other connecting means permits a piping element to be secured to the outer connecting means when a plug is positioned in the inner connecting means so that the plug may then be removed by the tool of my above identified application. The reverse operation may be conducted with equal facility and the fact that these operations can be performed permits a flow line to be connected to one lateral arm of the fitting for flow from the fitting and the source of pressure and while the other lateral arm is plugged. Subsequently, a flow line may be connected to the second and plugged arm and the plug removed so that flow may occur from that arm. The first arm may then be in turn plugged so that the flow line connected thereto may be repaired. In this way, the flow of fluid may continue without interruption and without any possibility of any fluid escaping and the source thus getting out of control.

In oil or gas well operation, for example, it has heretofore been customary to provide cross fittings only with an external thread for use as a connecting means. By that construction, it was impossible to replace flow lines, since fluid might then escape and the well might get from under control. The only procedure which could be adopted to change a flow line was to attach another cross fitting, and even this could only be accomplished by temporarily shutting off the well. The shutting off of a well, particularly a well which has been caused to flow by artificial stimulating methods, frequently resulted in a complete cessation of flow from the well.

It will be understood that the invention is not limited to the details of construction shown in the drawing and that the example of the use of the invention which has been given does not include all of the uses of which it is capable; and that the phraseology employed in the specification is for the purpose of description and not of limitation.

I claim:—

1. A pipe fitting provided with a bore and including an inlet and a pair of outlets, each outlet having a radially and outwardly extending flange provided with bolt apertures to enable piping elements to be connected thereto, the bore of each outlet including an outwardly flared seat portion, a tapered plug adapted to seat in said seat portion to form a seal therein, and means outward of said seat portion and forming no part thereof to hold said plug in said seat portion.

2. A pipe fitting provided with a bore and including an inlet and a pair of outlets, each outlet having a radially and outwardly extending flange provided with bolt apertures to enable piping elements to be connected thereto, said flange having radially extending apertures therein, the bore of each outlet including a tapered seat portion, a tapered plug adapted to seat in said seat portion to form a seal therein, said plug including an outwardly facing shoulder adjacent its larger end, and radially extending securing members positioned in the radial apertures of said flange and adapted to engage the outwardly facing shoulder on said plug to hold the latter sealed on the seat portion of the outlet bore.

JOHN R. YANCEY.